United States Patent [19]
von Gaisberg et al.

[11] Patent Number: 5,030,811
[45] Date of Patent: Jul. 9, 1991

[54] ELECTRIC CIGAR LIGHTER HAVING AN ILLUMINATING DEVICE

[75] Inventors: Alexander von Gaisberg, Beilstein; Klaus-Philipp Merz, Karlsruhe, both of Fed. Rep. of Germany

[73] Assignee: Schoeller & Co., Elektrotechnische Fabrik GmbH & Co., Frankfurt, Fed. Rep. of Germany

[21] Appl. No.: 589,227

[22] Filed: Sep. 26, 1990

[30] Foreign Application Priority Data

Sep. 29, 1989 [DE] Fed. Rep. of Germany ....... 3932601

[51] Int. Cl.$^5$ .......................................... F21V 33/00
[52] U.S. Cl. ................................. 219/268; 219/267; 362/32; 362/92; 362/80; 362/109
[58] Field of Search ............................. 219/265–269, 219/270, 260; 362/80, 92, 109, 32

[56] References Cited

U.S. PATENT DOCUMENTS

| | | | |
|---|---|---|---|
| 2,724,766 | 11/1955 | Hawley et al. | 362/32 |
| 3,619,591 | 11/1971 | Korski | 362/32 |
| 3,975,619 | 8/1976 | Uda | 362/92 |
| 4,079,242 | 3/1978 | Seibel | 362/32 |

FOREIGN PATENT DOCUMENTS 2254712 8/1973 Fed. Rep. of Germany .
2029559 3/1980 United Kingdom .

*Primary Examiner*—Bruce A. Reynolds
*Assistant Examiner*—John A. Jeffery
*Attorney, Agent, or Firm*—Armstrong, Nikaido, Marmelstein, Kubovcik, & Murray

[57] ABSTRACT

An electric cigar lighter has an illumination device in which only an annular zone around an electric cigar lighter is illuminated by means of a luminous ring. The electric cigar lighter makes it possible to illuminate not only a luminous ring surrounding the cigar lighter but also the centrally situated actuating button. It includes a first reflection surface, a light transmission web, light-passage openings, and a second reflection surface. Light rays emitted by a lamp and incident on the first reflection surface, the light rays being parallel to the central axis and within a sleeve wall, are not only directed into the luminous ring via the light transmission web but are also reflected radially into the inside of the illumination sleeve, through the light-passage openings, onto the second reflection surface and from there are thrown into a front zone of the actuating button. According to the invention, substantially homogeneous light distribution over the entire front zone of the cigar lighter is achieved.

20 Claims, 2 Drawing Sheets

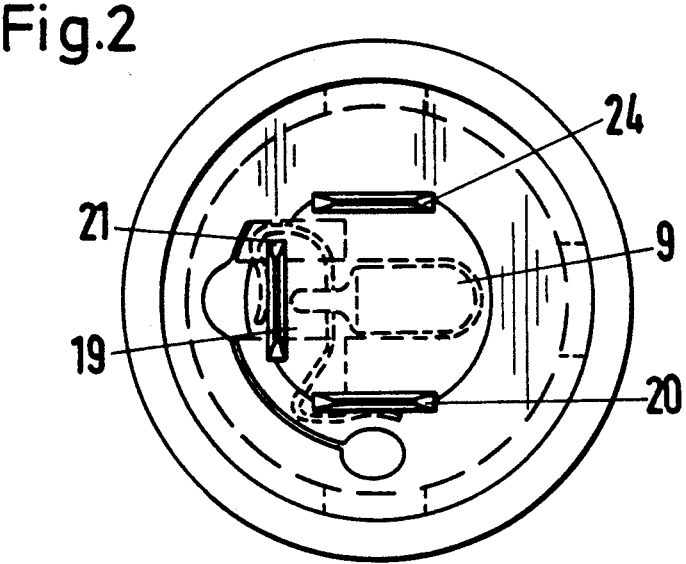
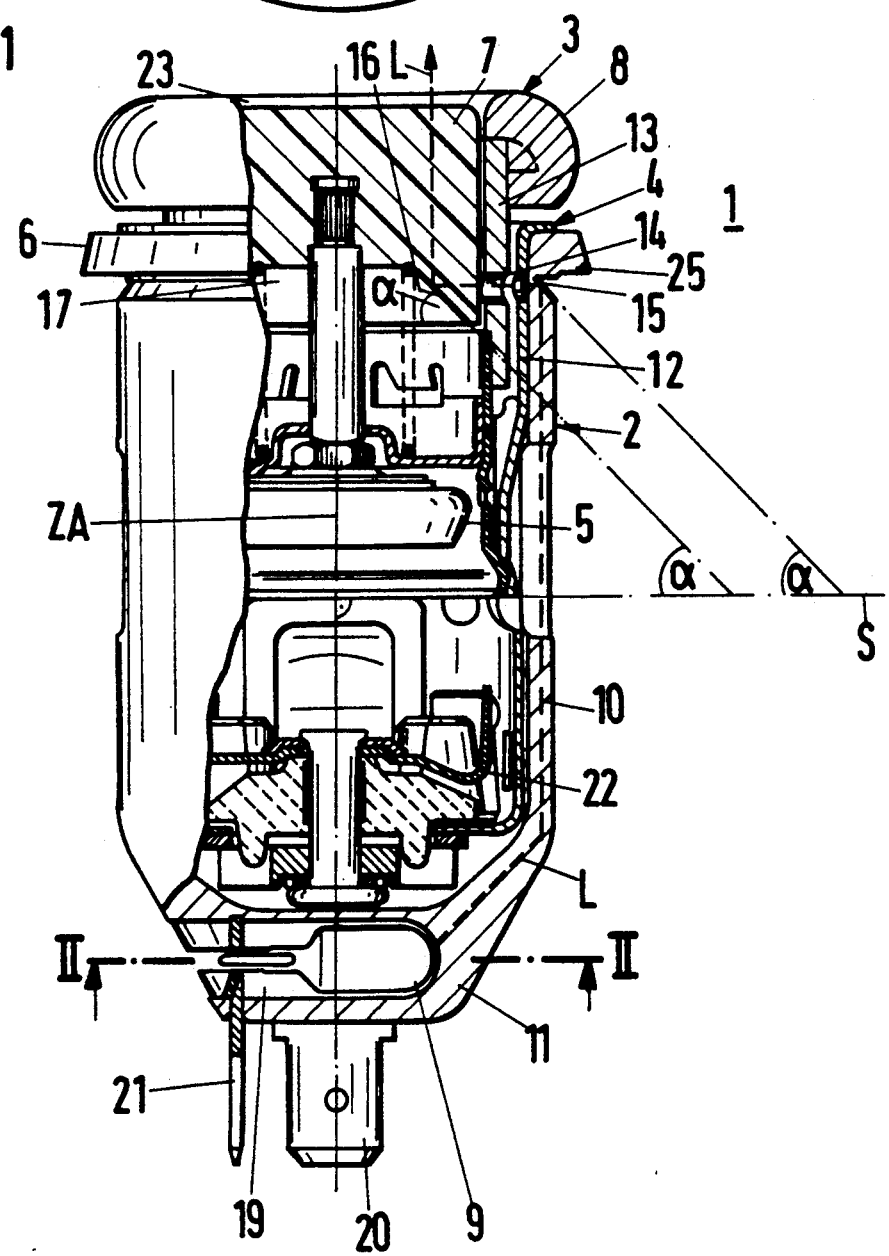

ELECTRIC CIGAR LIGHTER HAVING AN ILLUMINATING DEVICE

BACKGROUND OF THE INVENTION

The invention relates to an electric cigar or cigarette lighter for installation in the dashboard of a vehicle such as an automobile, the lighter having a light-conducting sleeve and an illuminated head.

German Utility Model Patent No. 7,819,579 discloses an illumination device for an electric cigar or cigarette lighter, in which an annular zone of uniform light distribution is produced around the grip of the ignition plug with the aid of a plastic sleeve, wherein the plastic sleeve is manufactured from a light-conducting material, and has a luminous ring. From time to time, however, it is desirable that the cigar lighter should be illuminated not only in an annular zone but in its entire disk-shaped front zone. A user can then see the cigar lighter more clearly in darkness, in particular from an oblique angle. In addition, an actuating button arranged within the grip can then be provided with an illuminable symbol.

German Patentschrift No. DE-PS 2,254,712 discloses an illumination device for cigar lighters, and includes a luminous ring provided with reflector prisms, a light-conducting attachment, and a lamp. From this it is known that the light flooding in to the light-conducting attachment is partially reflected at the boundary walls present on the light-conducting attachment, and then are reflected back into the wall of the light-conducting attachment. In addition, reflection surfaces which contribute to homogeneous light distribution in the luminous ring itself are provided on the reflector prisms.

German Patentschrift No. DE-PS 2,535,080, which is a patent of addition to DE-PS 2,254,712, and further discloses the provision of prisms with light-reflection surfaces for the purpose of directing the light of the lamp into the light-conducting attachment.

SUMMARY OF THE INVENTION

It is accordingly an object of the present invention to create an illumination device for an electric cigar lighter for illuminating not only a luminous ring surrounding the cigar lighter but also for illuminating a centrally situated actuating button of the electric lighter.

According to the invention, it is proposed to reflect light into the actuating button of an ignition plug, said button being manufactured from light-conducting material, via an illumination sleeve or an illumination ring. Light emitted by a lamp arranged behind the dashboard of a motor vehicle, at the rear side, is here transmitted parallel to the central axis with the aid of an illumination sleeve, an illumination ring or a light guide. A reflection surface inclined at an angle of inclination equal to 45 degrees to the perpendicular to the central axis and having the shape of the lateral surface of a truncated cone, and light-passage openings provided in a lighter socket wall and in an ignition plug wall, have the effect that the light can be reflected radially into the inside of the clamping sleeve through the light-passage openings. A conical recess is provided in the actuating button of the ignition plug, the actuating button being manufactured from light-conducting material, thereby forming a second reflection surface inclined at a constant angle of inclination around the central axis. This second reflection surface arranged inside the actuating button is preferably arranged at an angle of inclination equal to 45 degrees, and is parallel to the first reflection surface. It is thereby made possible for the light radially incident to the inside of the clamping sleeve to be thrown outward in a direction which is parallel to the central axis second reflection surface. Illumination of the actuating button is thereby provided in a simple manner without the necessity of changing the external dimensions of the cigar lighter. The illumination of the button can furthermore be switched on or off by axial displacement of the actuating button. A change in color in the front zone of the illumination button can also be achieved given a suitable choice of material.

In accordance with a further embodiment according to the invention, a plurality of second reflection surfaces are formed which extend circumferentially around the central axis of the cigar lighter in the actuating button manufactured from light conducting material. Each individual second reflection surface formed in the inside of the actuating button is inclined at an angle of inclination alpha to the perpendicular to the central axis, and the angle alpha can be different for different ones of the second reflection surfaces. It is thereby advantageously made possible for the light to be simultaneously reflected into any desired region of the front zone of the actuating button.

According to an expedient illustrative embodiment, the second reflection surfaces are arranged in rotationally symmetrical groups, an extremely homogeneous distribution of light in the actuating button thereby being achieved.

It is furthermore proposed to make the radii of the base circles of the truncated cones associated with the second reflection surfaces having the shape of the lateral surface of a truncated cone, and/or the angles of inclination of the second reflection surfaces within the rotationally symmetrically arranged groups of reflection surfaces, increase continuously or discontinuously in monotonic fashion. In the case of continuous increase, the second reflection surfaces then merge into one another, and likewise have outermost edges or arcs which merge continuously, the respectively associated arcs then join up to form a spiral curve.

According to a further advantageous embodiment of the invention, the illumination sleeve is cup-shaped, with a sleeve wall and a cup bottom surrounding the lighter socket on all sides. Due to this configuration and, in particular, because of the design of the cup bottom in the form of a solid cylinder, it is possible for a lamp required for the illumination to be accommodated centrally in the cup bottom. Homogeneous direction of light on all sides into the illumination sleeve is thus also obtained.

According to a further embodiment, the cup-shaped illumination sleeve can simultaneously also be designed as a lighter socket. Because the metal socket is then no longer present, the light-passage openings in principle to be provided in the socket are of course also omitted. A saving is thereby made on further parts.

BRIEF DESCRIPTION OF THE DRAWINGS

The invention will be described and explained in greater detail below with reference to the drawings, in which:

FIG. 1 shows a longitudinal side sectional view of a cigar lighter in accordance with a first embodiment of the invention, FIG. 2 shows a sectional view taken along section line II—II in FIG. 1.

DETAILED DESCRIPTION OF THE PREFERRED EMBODIMENT

Figure 3:
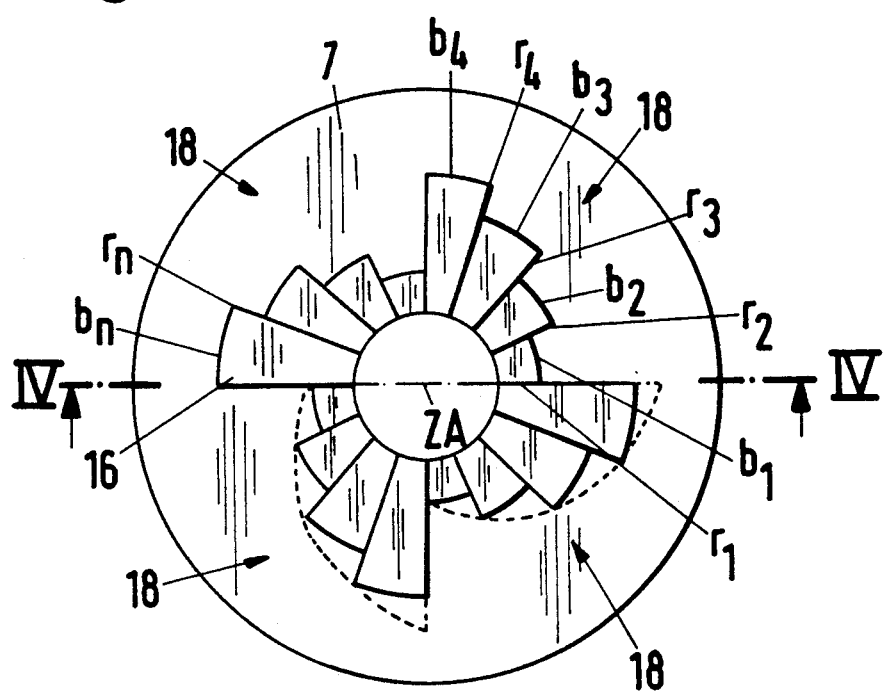
FIG. 3 shows a bottom elevational view of the actuating button of the electric cigar lighter in accordance with a second embodiment according to the invention.

FIG. 1 shows a median sectional view, from the side, of an electric cigar lighter 1 designed according to the invention, in accordance with a first embodiment. The electric cigar lighter 1 has a lighter socket 4, within which bimetal contact springs 22 gripping an incandescent head 5 of an ignition plug 3 are formed in a manner known per se. The electric cigar lighter can be connected to the current supply of the on-board electrical system, in particular of a motor vehicle, via positive contact parts 20, 24 and a negative contact part 21. The lighter socket 1 has a sleeve wall 10 and a cup bottom 11. Provided in the solid-cylindrical cup bottom 11 is a lamp socket 19 for a centrally arranged lamp 9. The light produced in the lamp 9 is transmitted within the sleeve wall 10 in a direction axially parallel to a central axis ZA and, via a light-transmission web 25 connecting the sleeve wall 10 to the luminous ring 6, partially directed into the luminous ring 6. Part of the light transmitted in the sleeve wall 10 strikes a first reflection surface 15 which is provided in the sleeve wall 10 at the transition between the sleeve wall 10 and the luminous ring 6. The first reflection surface 15 has the shape of the lateral surface of a truncated cone and extends peripherally around the central axis ZA at an angle of inclination $\alpha = 45°$ to the perpendicular to the central axis ZA. In a lighter socket wall 12 of the lighter socket 4 and in an ignition plug wall 13 of the ignition plug 3 there are light-passage openings 14, the light incident on the first reflection surface 15 thereby being reflected radially through the light-passage openings 14 into the inside of the illumination sleeve 2. The light is reflected radially in this way in a direction of the perpendicular S to the central axis ZA into the inside of an actuating button 7. The actuating button 7 is arranged in a grip 8 in such a way that the actuating button 7 can be displaced by pressure. The light reflected into the actuating button 7 is reflected upwardly, parallel to the central axis ZA at a second reflection surface 16. The light is reflected by the second reflection surface 16 into a front zone 23 of the actuating button 7. According to the first embodiment of the invention, shown in FIG. 1, there is a conical recess 17 at the underside of the actuating button 7, and the conical recess 17 is bounded by the second reflection surface 16, which extends coaxially around the central axis ZA and is inclined parallel to the first reflection surface 15 at a constant angle of inclination $\alpha = 45°$.

FIG. 2 schematically shows a view through the cup bottom 11 of the illumination sleeve 2, taken along section line II—II of FIG. 1. The lamp 9 positioned in the lamp socket 19 is connected electrically to a first positive contact part 20 and a negative contact part 21 and is aligned centrally and radially in the cup bottom 11. A substantially homogeneous introduction of light into the sleeve wall 10 is thereby obtained.

FIG. 3 shows a view of the underside of an actuating button 7' designed in accordance with a second embodiment of the invention. According to this further embodiment, sixteen second reflection surfaces 16 are arranged radially about the central axis ZA in a circumferentially non-overlapping configuration. In this arrangement, the second reflection surfaces 16 are arranged rotationally symmetrically around the central axis ZA in four groups 18, each of the groups 18 comprising four second reflection surfaces 16. Each of the individual second reflection surfaces 16 are inclined at respective angles of inclination on $\alpha_n$ (n = 1 to 16), and any or all of these angles may be different. These angles are measured with respect to the perpendicular S to the central axis ZA. In addition, each of the reflection surfaces 16 is designed as a partial surface of a lateral surface of a truncated cone extending along a circular arc $b_n$ (n = 1 to 16), the respective circular arc $b_n$ being a function of the radius $r_n$ of a base circle of a respectively associated truncated cone. Within each group 18 of, in the present case, four second reflection surfaces 16, the radii $r_n$ and the angle of inclination $\alpha_n$ increase in the circumferential direction in a monotonic fashion. In addition to the discontinuous increase of the respective radii $r_n$ and the angle of inclination $\alpha_n$ of the second reflection surfaces 16 shown in FIG. 3, a continuous increase of the radii $r^n$ and the angle of inclination $\alpha_n$ is also possible, in which case the arcs $b_n$ would no longer be circular but would merge continuously into one another within a given group 18 so as to form a spiral. By virtue of this embodiment, a substantially homogeneous distribution of light can be achieved over the entire front zone 23 of the actuating button 7.

Figure 4:
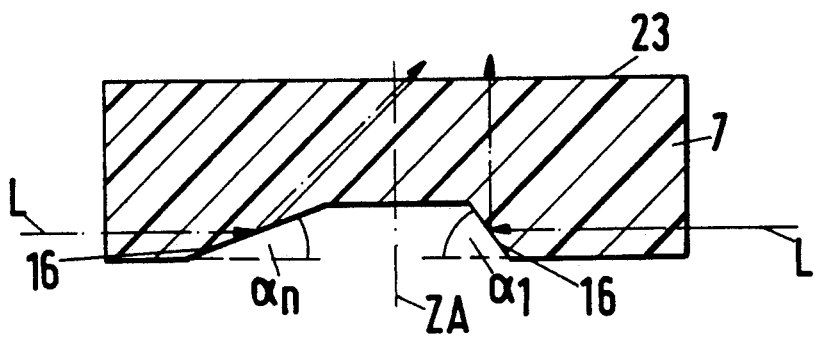
FIG. 4 shows a side sectional view of the actuating button taken along section line IV—IV in FIG. 3.

FIG. 4 shows a side sectional view of the actuating button 7 taken along line IV—IV of FIG. 3. In accordance with the different angles of inclination $\alpha_1, \ldots \alpha_n$ of the second reflection surfaces 16, the light rays L are reflected into different regions of the front zone 23 of the actuating button 7.

While preferred embodiments have been disclosed and illustrated, it will be understood that the present invention is not limited thereto, but may be otherwise embodied within the scope of the following claims.

What is claimed is:

1. An electric lighter for installation in a dashboard of a vehicle, comprising:

an ignition plug having a head and an actuating button;

a lighter socket receiving said ignition plug;

a light-conducting illumination sleeve receiving said lighter socket and which has a sleeve wall, said sleeve wall having a central axis and at least one light-reflection surface, said illumination sleeve having a luminous ring adjoining said sleeve wall;

a lamp in optical communication with one end of said illumination sleeve, said illumination sleeve having at least one first reflection surface having a shape corresponding to a surface of a truncated cone, which is coaxial about said central axis, said first reflection surface extending circumferentially along a circular arc and being inclined at a predetermined angle of inclination to a perpendicular to said central axis;

a light transmission web connecting said sleeve wall to said luminous ring; a plurality of light-passage openings in a wall of said lighter socket;

a wall of said ignition plug having a plurality of openings therein aligned axially and radially with respective ones of said plurality of light-passage openings in said wall of said lighter socket;

said head of said ignition plug having an interior conically-tapered surface axially aligned with said plurality of openings in said wall of said ignition plug, for directing light rays reflected by said first reflection surface into said head of said actuating button, said actuating button being of light-conducting material, said conically-tapered surface comprising a second reflection surface which is inclined at a selected angle of inclination.

2. An electric lighter according to claim 1, wherein said second reflection surface is inclined at an angle of inclination approximately equal to said predetermined angle of inclination of said first reflection surface.

3. An electric lighter for installation in a dashboard of a vehicle, comprising:
- an ignition plug having a head and an actuating button;
- a lighter socket receiving said ignition plug;
- a light-conducting illumination sleeve receiving said lighter socket and which has a sleeve wall, said sleeve wall having a central axis and at least one light-reflection surface, said illumination sleeve having a luminous ring adjoining said sleeve wall;
- a lamp in optical communication with one end of said illumination sleeve, said illumination sleeve having at least one first reflection surface having a shape corresponding to a surface of a truncated cone, which is coaxial about said central axis, said first reflection surface extending circumferentially along a circular arc and being inclined at a predetermined angle of inclination to a perpendicular to said central axis;
- a light transmission web connecting said sleeve wall to said luminous ring;
- a plurality of light-passage openings in a wall of said lighter socket;
- a wall of said ignition plug having a plurality of openings therein aligned axially and radially with respective ones of said plurality of light-passage openings in said wall of said lighter socket;
- said head of said ignition plug having an interior surface axially aligned with said plurality of openings in said wall of said ignition plug, for directing light rays reflected by said first reflection surface into said head of said actuating button, said actuating button being of light-conducting material, said interior surface of said head of said ignition plug comprising a second reflection surface being composed of a plurality of segments which are each formed in a shape of lateral surface of a truncated cone respectively having predetermined radii from said central axis, which have respective selected angles of inclination, and which have peripheral outermost edges extending along circular arcs.

4. An electric lighter as claimed in claim 3, wherein said predetermined number of second reflection surfaces are arranged in rotationally symmetrical groups about said central axis.

5. An electric lighter according to claim 4, wherein within each of said groups of said second reflection surfaces, each of said second reflection surfaces extend at different radii from said central axis.

6. An electric lighter according to claim 3, wherein within each of said groups of said second reflection surfaces, each of said second reflection surfaces extend at different, varying radii which merge into one another smoothly and continuously, said second reflection surfaces having respective outer peripheral edges extending along respective arcs, said respective arcs joining to form a spiral.

7. An electric lighter as claimed in claim 1, wherein said illumination sleeve is cup-shaped, having said sleeve wall and having a cup bottom which surrounds said lighter socket.

8. An electric lighter according to claim 7, wherein said sleeve wall is shaped as a hollow cylinder and said cup bottom is shaped as a solid cylinder.

9. An electric lighter according to claim 7, further comprising a lamp socket for receiving said lamp, said lamp socket being disposed in said cup bottom.

10. An electric lighter as claimed in claim 7, wherein said cup-shaped illumination sleeve additionally includes a lighter socket therein.

11. An electric lighter according to claim 4, wherein within each of said groups of said second reflection surfaces, each of said second reflection surfaces extend at different angles of inclination which increase in a circumferential direction about said central axis.

12. An electric lighter according to claim 4, wherein within each of said groups of said second reflection surfaces, each of said second reflection surfaces extend at different, varying radii which merge into one another smoothly and continuously, said second reflection surfaces having respective outer peripheral edges extending along respective arcs, said respective arcs joining to form a spiral.

13. An electric lighter according to claim 5, wherein within each of said groups of said second reflection surfaces, each of said second reflection surfaces extend at different, varying radii which merge into one another smoothly and continuously, said second reflection surfaces having respective outer peripheral edges extending along respective arcs, said respective arcs joining to form a spiral.

14. An electric lighter as claimed in claim 3, wherein said illumination sleeve is cup-shaped, having said sleeve wall and having a cup bottom which surrounds said lighter socket.

15. An electric lighter according to claim 14, wherein said sleeve wall is shaped as a hollow cylinder and said cup bottom is shaped as a solid cylinder.

16. An electric lighter according to claim 8, further comprising a lamp socket for receiving said lamp, said lamp socket being disposed in said cup bottom.

17. An electric lighter according to claim 15, further comprising a lamp socket for receiving said lamp, said lamp socket being disposed in said cup bottom.

18. An electric lighter according to claim 8, wherein said cup-shaped illumination sleeve additionally includes a lighter socket therein.

19. An electric lighter according to claim 9, wherein said cup-shaped illumination sleeve additionally includes a lighter socket therein.

20. An electric lighter as claimed in claim 16, wherein said cup-shaped illumination sleeve additionally includes a lighter socket therein.

* * * * *